Jan. 2, 1945.　　　G. W. PHEAZEY　　　2,366,456
DETACHABLE CLIP FASTENER
Filed Nov. 11, 1943
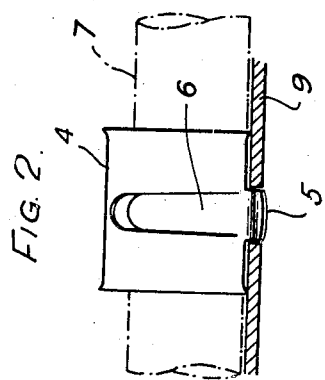
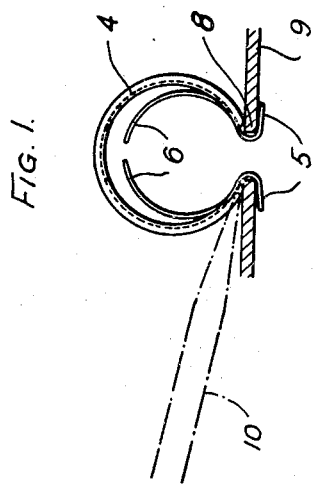
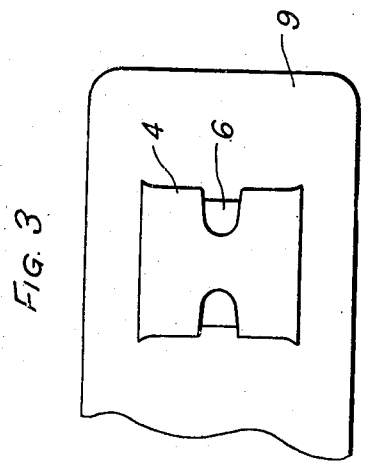
INVENTOR.
GEORGE WILLIAM PHEAZEY.
BY Walter S. Jones
ATTORNEY Patented Jan. 2, 1945

2,366,456

UNITED STATES PATENT OFFICE 2,366,456

DETACHABLE CLIP FASTENER

George William Pheazey, Nottingham, England

Application November 11, 1943, Serial No. 509,930
In Great Britain February 1, 1943

1 Claim. (Cl. 24—73)

This invention relates to detachable clip fasteners particularly adapted for clamping articles such as tubes, rods, wires or cables or bunches thereof to apertured supports.

According to the invention the fastener is formed from one piece of spring sheet metal and is in the form of an expansible and contractible loop adapted to embrace the article to be secured, the ends of the loop having outwardly turned lugs adapted to pass through or snap into the aperture in the support to hold the fastener securely in engagement therewith.

The sides of the loop are also formed with spring tongues stamped or pressed out from the material of the fastener and bent inwardly so that they embrace the article to be secured and assist in holding it against rattling and also enable the fastener to be used with articles of various diameters or sizes and further allow for variations in diameter of tubing, cables or the like.

To enable the invention to be fully understood it will now be described by reference to the accompanying drawing, in which:

Fig. 1 is a part sectional elevation showing a clip fastener according to one form of the invention in position on an apertured support, Fig. 2 is a side view thereof, and Fig. 3 is a plan view.

As shown the fastener is formed from one piece of spring metal and comprises an expansible and contractible loop 4 having outwardly turned ends forming lugs 5 and spring tongues 6 stamped or pressed out of the sides of the loop and bent inwardly.

In use the tube or the like to be secured, indicated at 7 in Fig. 2, is pressed into the loop so that the tongues 6 embrace it and hold it against movement and the ends of the loop 4 are pressed to allow the lugs 5 to be snapped into the aperture 8 in the support 9 and hold the clip firmly to the support.

In Fig. 1 a flat-edged tool 10 is indicated which is pressed against the side of the loop 4 either to release the clip for removal or to assist in the assembly as will be understood.

The edges of the loop 4 are preferably rounded or flared outwardly as shown so that the fasteners may be used close to the bends of tubes or cables without damaging same. After fixing, the fastener allows for directional alterations as it is capable of being rotated about the centre of the aperture 8.

The tongues 6 are here shown as extending from points adjacent to the securing lugs 5 to substantially the top of the fastener, but obviously the shape and length of these tongues and securing lugs may be varied as desired.

While the fastener is preferably a one-piece construction the tongues may be separate pieces suitably attached to slotted or apertured parts of the loop as will be understood.

I claim:

A fastener of the class described comprising an expansible and contractible loop formed from a single piece of sheet metal, the ends of the loop being normally spaced from each other and having outwardly turned lugs adapted to pass through and snap into an aperture in a support by movement of the spaced ends toward each other, spring tongues formed from the material of the loop and bent toward each other so that they embrace an article to be secured to a support by the fastener and permit independent movement of the remainder of the loop when the lugs are pressed toward each other for snapping into the aperture of the support.

GEORGE WILLIAM PHEAZEY.